US007420587B2

(12) United States Patent
Davis

(10) Patent No.: US 7,420,587 B2
(45) Date of Patent: Sep. 2, 2008

(54) APPARATUS AND METHOD FOR INSPECTING SEWER LINES USING SMALL MOBILE VEHICLES

(76) Inventor: Rufus Davis, 1535 N. Post Oak, Houston, TX (US) 77055

( * ) Notice: Subject to any disclaimer, the term of this patent is extended or adjusted under 35 U.S.C. 154(b) by 0 days.

(21) Appl. No.: 10/884,069

(22) Filed: Jul. 2, 2004

(65) Prior Publication Data

US 2005/0000546 A1 Jan. 6, 2005

Related U.S. Application Data

(60) Provisional application No. 60/484,829, filed on Jul. 3, 2003.

(51) Int. Cl.
*H04N 7/18* (2006.01)

(52) U.S. Cl. .......................................... 348/82; 348/84

(58) Field of Classification Search ............. 348/82–90, 348/142–170
See application file for complete search history.

(56) References Cited

U.S. PATENT DOCUMENTS

| | | | | |
|---|---|---|---|---|
| 4,234,980 | A | 11/1980 | DiVito et al. | |
| 4,537,136 | A * | 8/1985 | Douglas | 104/138.2 |
| 4,896,686 | A | 1/1990 | Schmidt, Jr. et al. | |
| 4,993,443 | A | 2/1991 | Buchert | |
| 5,333,969 | A * | 8/1994 | Blaha et al. | 404/91 |
| 5,435,854 | A * | 7/1995 | Derlein | 134/22.11 |
| 6,111,600 | A | 8/2000 | McLeod et al. | |
| 6,138,697 | A | 10/2000 | HÖrger et al. | |
| 6,237,177 | B1 * | 5/2001 | Richardson | 15/4 |
| 6,294,084 | B1 | 9/2001 | Henkin et al. | |
| 6,349,653 | B1 | 2/2002 | Siedlarczyk | |
| 6,887,014 | B2 * | 5/2005 | Holland | 405/184.1 |
| 6,958,767 | B2 * | 10/2005 | Olsson et al. | 348/82 |
| 7,007,761 | B1 * | 3/2006 | Johnson, IV | 169/24 |
| 2003/0182754 | A1 * | 10/2003 | O'Brien | 15/302 |

OTHER PUBLICATIONS

Brzozowski-Garner, Carol, *The Weird and the Wonderful, Cleaner*™, For residential, municipal and industrial cleaning contractors, Sep. 2002, pp. 28-29, www.cleaner.com.
Cobra Technologies, Pipeline Video Inspection Equipment & Software Solutions, Sep. 2002, p. 35, www.cleaner.com.
WMI Innovation in Industrial Equipment, Easement Machine, Tracked Power Carrier, www.wmitsh.com.
Envirosight, Rovver System Mounted on ATV, Rovver system crawler.

* cited by examiner

*Primary Examiner*—Andy S Rao
(74) *Attorney, Agent, or Firm*—Fulbright & Jaworski, LLP

(57) ABSTRACT

A light weight vehicle adapted to conduct and assist cleaning and video inspections of sewer lines. The vehicle is configured to be light and maneuverable. The vehicle is equipped with inspection cameras and support equipment that are positioned such that the operator can conduct the inspection from inside the vehicle. The vehicle may also include a telescoping camera boom that enables an operator to inspect the inside of manholes. The vehicles includes sides and a roof that provides protection for the operators, equipment, and paperwork.

25 Claims, 5 Drawing Sheets

APPARATUS AND METHOD FOR INSPECTING SEWER LINES USING SMALL MOBILE VEHICLES

CROSS-REFERENCE TO RELATED APPLICATIONS

This application claims priority to Provisional Application No. 60/484,829.

TECHNICAL FIELD

The present invention discloses novel vehicles adapted to assist in sewer maintenance operations. The novel vehicles may be configured for conducting video inspections of a sewer line and manholes ("inspection vehicle) or for assisting in sewer cleaning operations ("support vehicle"). When configured for video operations, the novel vehicles are equipped with the necessary equipment for carrying out video inspections. When configured for support operations, the novel vehicles are equipped with water access equipment. In both configurations, the novel vehicles are equipped with a selection of hand tools.

The disclosed method for cleaning and performing video inspections of sewer lines and manholes require the coordination of various employees, vehicles, equipment, and a mobile hose pulling apparatus (hereafter "hose puller"). The hose puller is disclosed in an application entitled Method and Apparatus for Pulling Hose, also claiming priority to Provisional Application No. 60/484,82, which is expressly incorporated herein by reference. The novel vehicles disclosed herein and methods of using the vehicles significantly increases the efficiency of sewer maintenance operations.

BACKGROUND OF THE INVENTION

Sewer lines are cleaned using high pressure water connected to a cleaning head. The cleaning head is inserted into the sewer line at a downstream manhole. Once inserted, the cleaning head is propelled up-stream through the sewer line by the high pressure water. The debris dislodged by the high pressure water is washed downstream and collects in the downstream manhole. The high pressure water is supplied by a cleaning truck.

A typical cleaning truck is equipped with a 40 ft. suction boom with a removable stand pipe. The cleaning crew uses the suction boom and stand pipe to remove the debris that accumulates in the downstream manhole. The debris that is removed from the downstream manhole is stored on the cleaning truck in debris tanks.

The standard cleaning truck is large and heavy and must be kept on a hard surface capable of supporting its weight. A standard cleaning truck often cannot reach manholes that are outside of the 40 ft. boom reach. When manholes are more than 40 ft. from a hard surface, additional equipment and crew members required. A typical cleaning and television inspection requires four people. When a manhole is in a remote easement area, five people may be required.

The disclosed novel vehicles and method allow sewer cleaning and television inspection to be conducted in remote easement areas without additional equipment or crew members. The novel vehicles and method allow a typical crew size to be reduced to three people.

BRIEF SUMMARY OF THE INVENTION

The present invention is directed to a mobile service vehicle with a compact body having an interior and an exterior; two wheels rotationally engaged to the compact body; a power source connect to the compact body and operationally associated with at least one of the wheels; a steering control operationally associated with at least one of the wheels; and a sewer cleaning line reel mounted to the compact body. The compact body is generally sized to be less than 40 inches wide and tall enough to allow an operator to sit comfortably inside. The power source is a plurality of batteries The mobile service vehicle may be configured with the sewer cleaning line reel mounted on the exterior of the compact body. In one configuration, the reel is sized to hold 700 ft. of 1¼" lay flat hose.

The mobile service vehicle may further include a reel control for controlling the sewer cleaning line reel. The reel control is optimally mounted to the exterior of the compact body. Further, the sewer cleaning line reel may be adapted to be powered by the power source.

The mobile service vehicle may also include wheels that are sized and treaded to support the mobile service vehicle on soft ground.

Another embodiment includes a mobile inspection vehicle comprising a compact body having an interior and an exterior; a seat positioned in the interior of the compact body; two wheels rotationally engaged to the compact body; a power source connect to the compact body and operationally associated with at least one of the wheels; a steering control operationally associated with at least one of the wheels; and a camera boom connected to the compact body. The mobile inspection vehicle may further include a reel adapted to manipulate a transmission line. The reel may be positioned on the compact body in operational alignment with the camera boom.

The mobile inspection vehicle may further include a reel control box that is connected to the reel for controlling the reel. The reel control box is ideally positioned in the interior of the compact body. Also, the reel control box may be positioned relative to the seat such that the reel control box is within easy reach of an operator sitting in the seat.

The mobile inspection vehicle may further include a transmission line stored on the reel. The transmission line has a first end adapted to be connected to a video inspection camera and a second end adapted to be connected to a video recorder. The transmission line may be sized to suit a particular application. For most inspection operations, the transmission line is over 1,000 feet long.

The mobile inspection vehicle may further include a video camera control box for controlling a video inspection camera. The video control box is positioned on the interior of the compact body. Ideally, the video control box should be positioned within easy reach of an operator sitting in the seat.

The mobile inspection vehicle disclosed is also configured with a camera boom. The camera boom may be of many different designs, but two designs are particularly adapted for sewer inspections. In one, the camera boom comprises a frame member with a proximal and distal edge, wherein the proximal edge is in rotationally engaged to the compact body; a stand connected to the frame member and configured to support the camera boom when in a deployed position; and a guide spool rotationally connected to the distal edge of the frame member. In the other, the camera boom comprises a telescoping body having an upper and lower end; a mounting bracket connecting the telescoping body to the compact body; a guide spool rotationally connected to the upper end of the telescoping body; and a camera connected to the lower end of the telescoping body. In both applications, a transmission line provides a video connection from the camera to the inspection vehicle. However, it is contemplated that the connection may be direct or indirect. Further, the connection may be wireless.

In an optimal configuration, the camera attached to the telescoping camera boom is a pan and tilt camera. For additional functionality, a laser may be associated with the camera to provide a measuring capability not normally inherent in a camera. The telescoping camera boom is configured to be at least at least six feet long when fully extended.

The mobile inspection vehicle may further include a power inverter positioned on the compact body and connected to the power source.

The mobile inspection vehicle may further include a video monitor positioned within the cabin of the inspection vehicle, wherein the video monitor is operably connected to the camera.

The mobile inspection vehicle may further include a video recorder connected to the video camera.

The mobile inspection vehicle may further include an air compressor and hose. The compressed air hose should be accessible from the exterior of the compact body.

The mobile inspection vehicle may further include an air conditioning unit connected to the compact body such that cool air is provided to the interior of the compact body.

The mobile inspection vehicle may further include a keyboard adapted to enter text onto the video image displayed on the video monitor.

The mobile inspection vehicle may further include a microphone adapted to enter verbal comments onto the video image.

A further embodiment of the current invention includes a method of cleaning and inspecting sewer lines comprising the steps of positioning a cleaning truck in proximity to a manhole; running a hose from the cleaning truck to a water source; connecting the hose to the water source; running a hose from the cleaning truck to the manhole; attaching a jet water cleaning nozzle to the water hose; feeding the jet water cleaning nozzle into the sewer line to be cleaned. A hose puller may be used to pull the hose from the cleaning truck to the manhole. The hose puller may also be used to supply hose into the manhole during the cleaning operation.

The method may further include the step of positioning a mobile inspection vehicle at a downstream manhole to monitor the progress of the jet water cleaning nozzle.

The method may also include the step of communicating to the cleaning truck when the jet water cleaning nozzle completes a section of sewer line.

The method may also include the step of running a debris hose from the cleaning truck to the manhole and applying a suction to remove debris from the manhole.

The method may also include the step of monitoring the progress of the hose remotely from the cleaning truck.

The method may also include the step of feeding visual inspection equipment into the cleaned sewer line from the inspection vehicle.

The method may also include the step of viewing and commenting on the inspection footage from inside the mobile inspection vehicle.

The method may also include the step of recording the images from the visual inspection equipment, which inspection equipment is typically a sewer line inspection camera.

The method may also include the step of controlling the movement of the visual inspection equipment from inside the mobile inspection vehicle.

A further embodiment of the invention includes a method of inspecting manholes comprising the steps of positioning a inspection vehicle next to a manhole; lowering a camera attached to a telescoping camera boom into the manhole; controlling the camera direction and depth from the interior of said inspection vehicle; and recording the images captured by the camera. The method may further include using a pan and tilt camera, which may be configured to include a laser for taking laser measurements. The method may further comprise the step of taking measurements using the laser.

The method may further include the step of tracking the amount of transmission line used in order to determine the depth of the manhole. The method may further include the step of recording comments and relevant inspection data on the images captured by the camera.

The foregoing has outlined rather broadly the features and technical advantages of the present invention in order that the detailed description of the invention that follows may be better understood. Additional features and advantages of the invention will be described hereinafter which in addition to the above form the subject of the claims of the invention. It should be appreciated that the conception and specific embodiments disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures are provided for the purpose of illustration and description only and are not intended to define of the limits of the present invention.

BRIEF DESCRIPTION OF THE DRAWINGS

The advantages, features, and details of the invention are explained in greater detail in the following description of the preferred embodiment, with the aid of drawings as listed below. For a more complete understanding of the present invention, reference is now made to the following descriptions taken in conjunction with the accompanying drawing, in which.

DETAILED DESCRIPTION OF THE INVENTION

Upon review of the detailed description and the accompanying drawings provided herein, it will be apparent to one of ordinary skill in the art that maneuverable sewer utility vehicles may be used in a wide variety of applications that require inspection and support equipment to be transported through narrow access ways or across soft or fragile ground. Accordingly, the present invention is not limited to the structures and methods specifically described and illustrated herein. The disclosed vehicles are uniquely adapted to operate near and at a work site. The vehicles also provide enclosed environments that protect equipment and documents from the environment.

A. Mobile Inspection Vehicle

Figure 1:
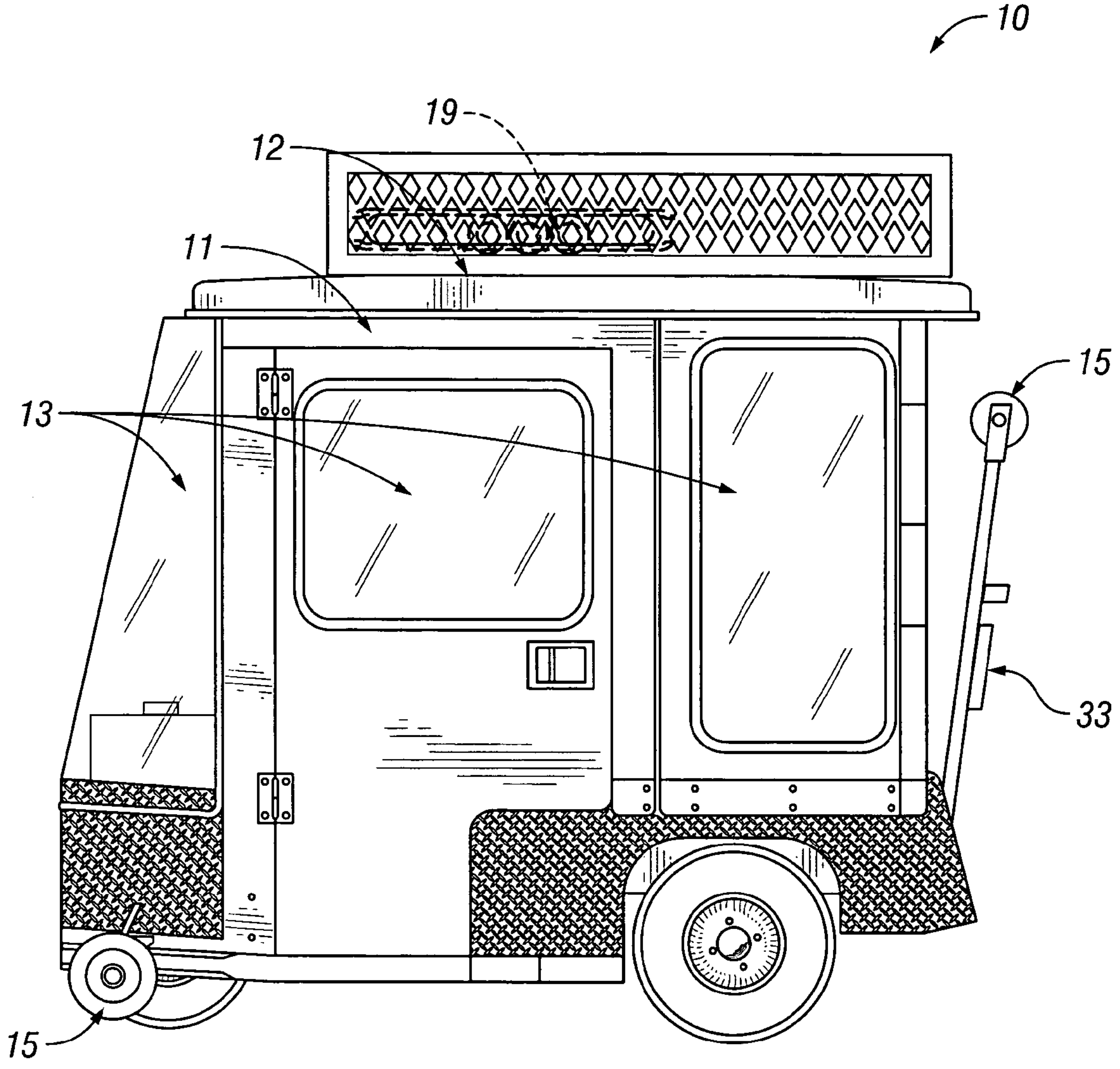
FIG. 1 is a side view of a vehicle adapted for video inspections.

FIG. 1 shows a mobile access vehicle 10 adapted for video inspection. The vehicle 10 is designed to be around thirty inches wide and six feet long. One skilled in the art readily understands that the size may be varied depending on the equipment and the particular application. In all applications, however, the vehicle is designed to be small and mobile. The size of the vehicle shown in FIG. 1 is limited in that it must be small enough to pass through easements such as alleyways and yards to reach manholes. Compact, as used herein means sized generally as described above, yet large enough to allow a person to sit comfortably in the interior of the vehicle.

Additionally, the vehicle 10 must be light enough cross soft surfaces without causing undue damage. For example, access to a manhole may require travel across a grass or other soft surfaces that are not strong enough to support a car or truck.

FIG. 1 shows the vehicle with three wheels. However, it is contemplated that the vehicle may have four wheels. The wheels are relatively wide to better distribute the weight over a larger area. In the three wheel variation shown, additional stability wheels 32 may be used to support to the vehicle while turning or working on a slope. The stability wheels 32 are positioned on both sides of the vehicle in the manner shown. Because the width of the vehicle is important, the stability wheels 32 are designed not to extend beyond the width of the vehicle body. Alternatively, the stability wheels can be configured to be retractable such that the vehicle 10 may navigate tight areas and extend the stability wheels 32 only when necessary. In such a configuration, the stability wheels may be configured to extend beyond the width of the vehicle.

Vehicle 10 is also shown with sides 11 and a roof 12. Sides 11 and roof 12 enclose and protect sensitive electronic equipment and documents from damaging weather and dust. Additionally, sides 11 and roof 12 protect the operator from low lying branches and the like and provide a comfortable environment in which to work. Sides 11 are sized to allow an operator to sit conformably inside the cabin. Sides 11 and top 12 may be made of any lightweight material. Examples include light gage steel, plastic, or a heavy tarp. Sides 11 include windows 13. The windows 13 may be tinted to allow an operator to view video images in bright sunlight. The interior of the vehicle is defined by that area enclosed by the sides and roof. The interior is designed to provide an area that is protected from the weather, dust and the like.

Figure 2:
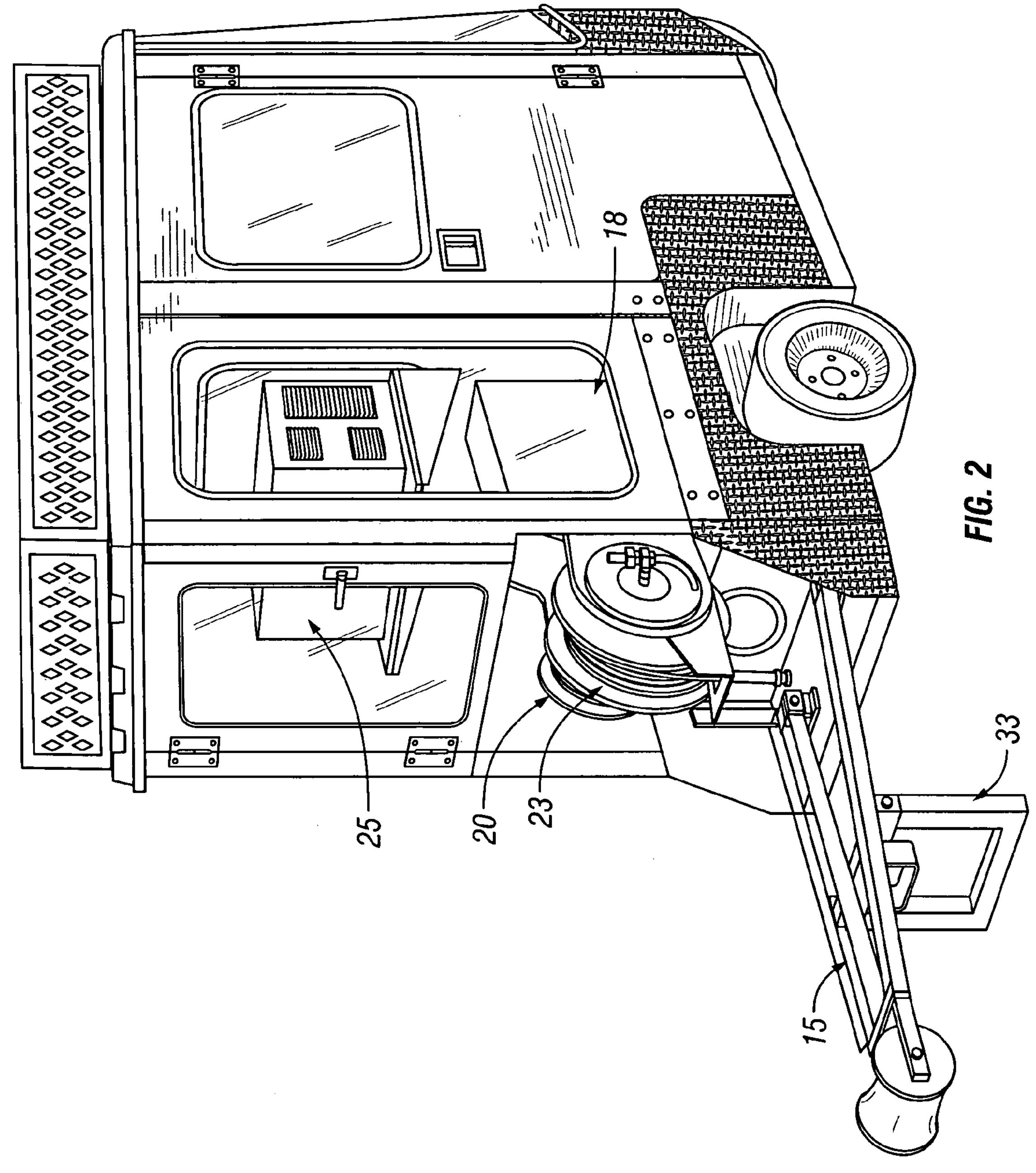
FIG. 2 is a rear view of a vehicle adapted for video inspections.

A vehicle that is adapted for video inspection optimally includes a camera boom 15. The camera boom is attached to the vehicle 10 and is lowered to a generally horizontal position for use (deployed position). FIG. 2 shows the back of vehicle 10 with the camera boom in the lowered position. Stand 33 supports the camera boom 15 when in a lowered position.

Figure 3:
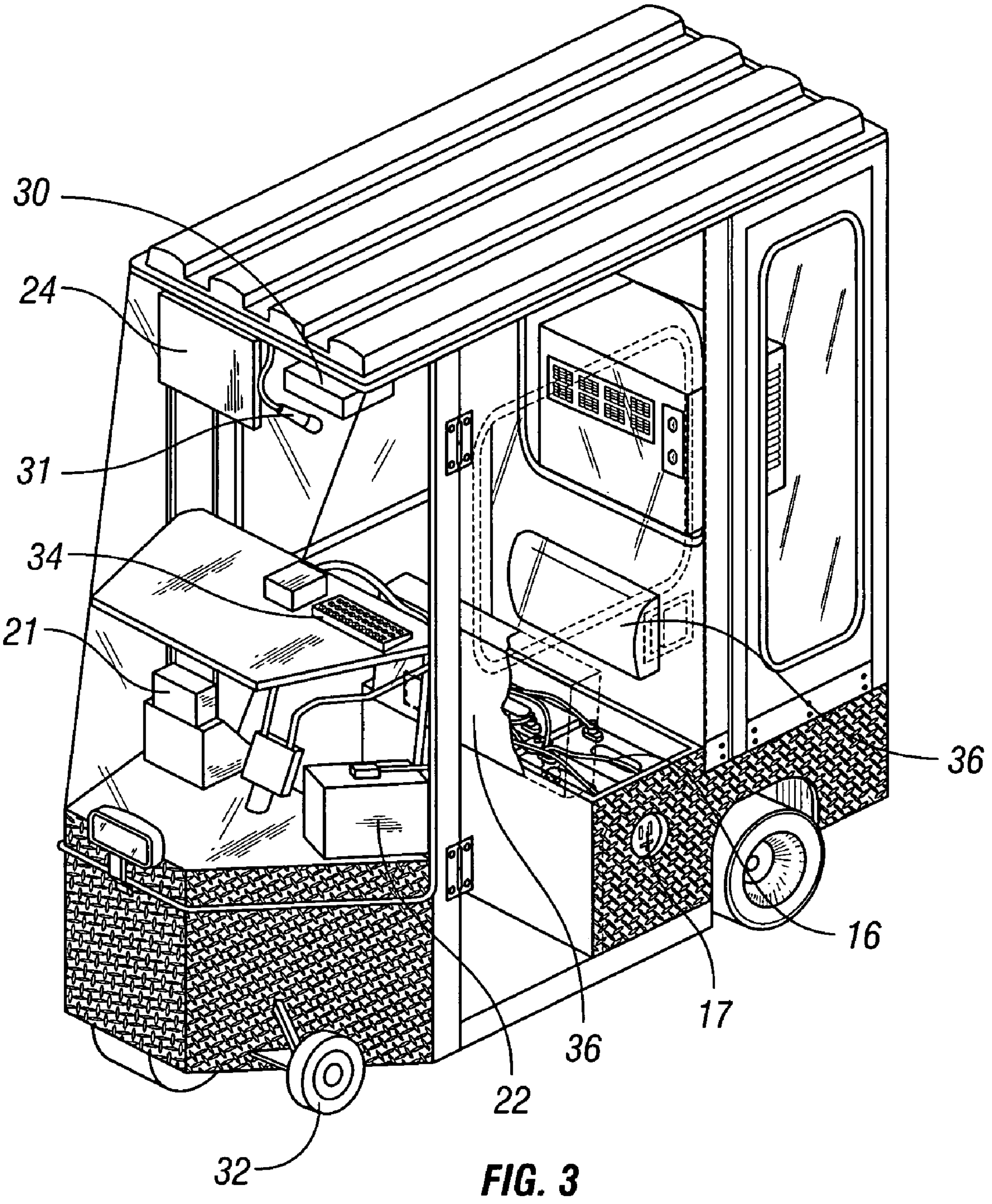
FIG. 3 is a view of equipment positioning within a vehicle adapted for video inspections.

A vehicle configured for video inspection may also include the following components, which are shown in FIGS. 2 and 3:

a. An on-board battery power source 16 that consists of four 24-volt batteries. Although four batteries are shown, it is understood that any number of batteries may be used. The voltage provided by the batteries may also be adjusted to suit a particular application. The batteries are charged using recharge receptacle 17. The vehicle is battery powered both with respect to movement and operation of substantially all on-board equipment. Although the vehicle is shown with an on-board battery power source, one skilled in the art understands that alternate sources of power may be provided. For example, the vehicle may be equipped with a gas powered generator. The batteries are shown under a flip-up seat 36.

b. A power inverter 18. The power inverter 18 is connected to the on-board battery source and converts the power to 120 volts AC. The vehicle may also be configured with transformers or the like as needed to operate various equipment. Additionally, the vehicle may configured with AC plugs ins for electrical equipment.

c. A pan and tilt and lighted-head camera 19 (shown in FIG. 1). The pan and tilt and lighted-head camera is particularly adapted for inspecting sewer lines. However, the vehicle may also be equipped with alternative types of equipment. Examples include survey equipment, sensors, and the like. The cameras are connected to the transmission lines when they are in use. The images generated from the camera are shown on a television monitor 24 in the interior of the vehicle.

d. A coaxial transmission line and reel unit 20. The coaxial line is provided for use with the video equipment, although it may be adapted for other equipment. Optimally, the transmission line is at least 1,500 ft. long, though various lengths are contemplated. The coaxial reel unit is also adapted to track the length of coaxial transmission line that is used during a video operation. Tracking the amount of cable used allows the operator to monitor where in the sewer line the video camera 19 is located. This data may also be input and stored on the video footage. The reel is controlled by a reel control box 21. The reel control box 21 enables the operator to control the speed of the reel rotation. Although a transmission line is described, one skilled in the art understands that any means of transmitting the video image from the camera to the operator may be used. The reel control box is shown in the interior of the vehicle.

e. A camera control box 22. The camera control box 22 controls the pan and tilt and lighted head camera 19. The camera 19 can be controlled both in terms of movement within the sewer line and the direction of the camera lens. The camera control box is shown in the interior of the vehicle.

f. An over-write device for entering specific job information on the magnetic recorder 30. Although a VCR is shown, it is contemplated that any number of devices that store information can be used, including a computer. Information may be manually entered by a keyboard 34, automatically stored or stamped on the recordings, or combinations thereof. For example, information on the amount of coaxial transmission line used may be input onto the inspection image as a length measurement. It is also contemplated that GPS information may be recorded. Further, the vehicle 10 may include a microphone 31 for recording comments on the inspection images. The information is entered by the inspection vehicle operator while they are inside the vehicle conducting the inspection. The information entered by the operator may be recorded along with the video image or as a separate file.

g. A compressed air apparatus with hose and reel 23. The compressed air apparatus may be an air storage tank or an air compressor. The air compressor is connected to the vehicle batteries.

h. A television monitor 24. The television monitor is set up to review in real time the images from the camera. Alternative systems for viewing images are also contemplated. For example, the televisions monitor could be replaced with a computer monitor. Although one monitor is shown, multiple monitors may be employed.

i. An air conditioner, heater, or other climate control devices 25. The climate control device is positioned to control the climate on the interior of the vehicle. The climate on the interior may be controlled to protect sensitive electronic equipment or simply for the comfort of the operator. The climate control device is powered by the vehicle battery power.

j. General use tools that include, but are not limited to, shovels, pick-axes, pry bars, sledge hammers, safety harnesses, and lights.

k. Communication equipment such as radios, walkie-talkies, phones, or the like.

Figure 4:
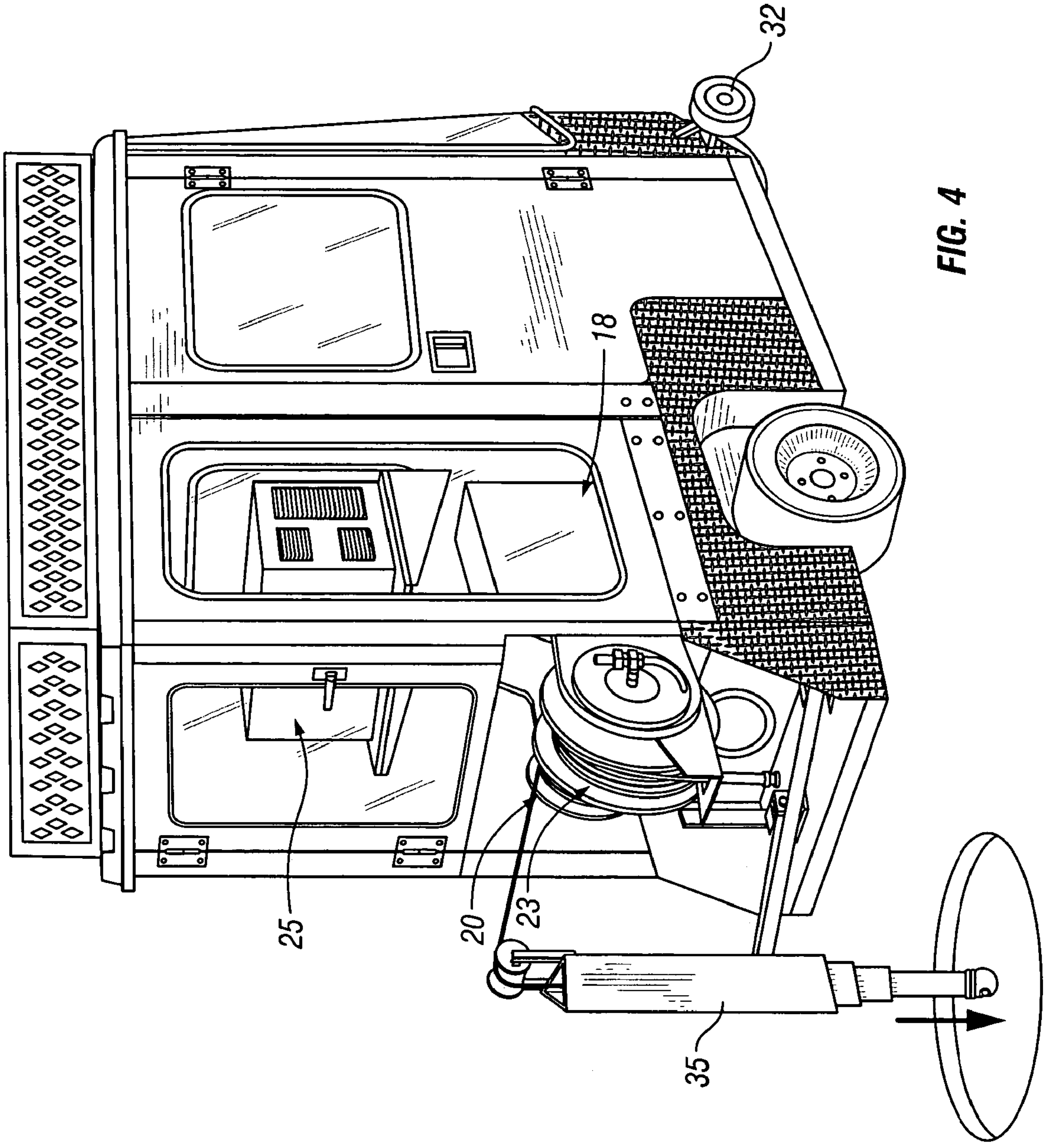
FIG. 4 is a view of a telescoping camera boom that may be mounted to a vehicle adapted for video inspections.

Instead of camera boom 15, vehicle 10 may be configured with a telescoping camera boom 35 for manhole inspections. FIG. 4 shows a telescoping camera boom 35. The telescoping camera boom 35 includes a telescoping set of tubes that allows an attached pan and tilt camera to be lowered into a manhole for inspection of the manhole interior. The camera may also include a laser for taking measurements and readings within the manhole. The telescoping camera boom 35 is attached to the mobile vehicle to provide the necessary strength and rigidity from which the camera can perform its actions. The telescoping set of tubes stabilizes the camera while it is in use. The camera is raised and lowered using the coaxial cable and reel unit 20. As with the transmission line used with camera boom 15, the transmission line used with camera boom 35 is configured to automatically record the depth of a manhole. This is accomplished by tracking the amount of transmission line used. Once skilled in the art understands that other means of automatically recording depth are available.

The combination of the mobile vehicle, moving on its own power, and the attached manhole inspector allows the inspection operator to quickly and easily move from one manhole to another for inspection, including manholes in remote areas.

B. Mobile Support Vehicle

Figure 5:
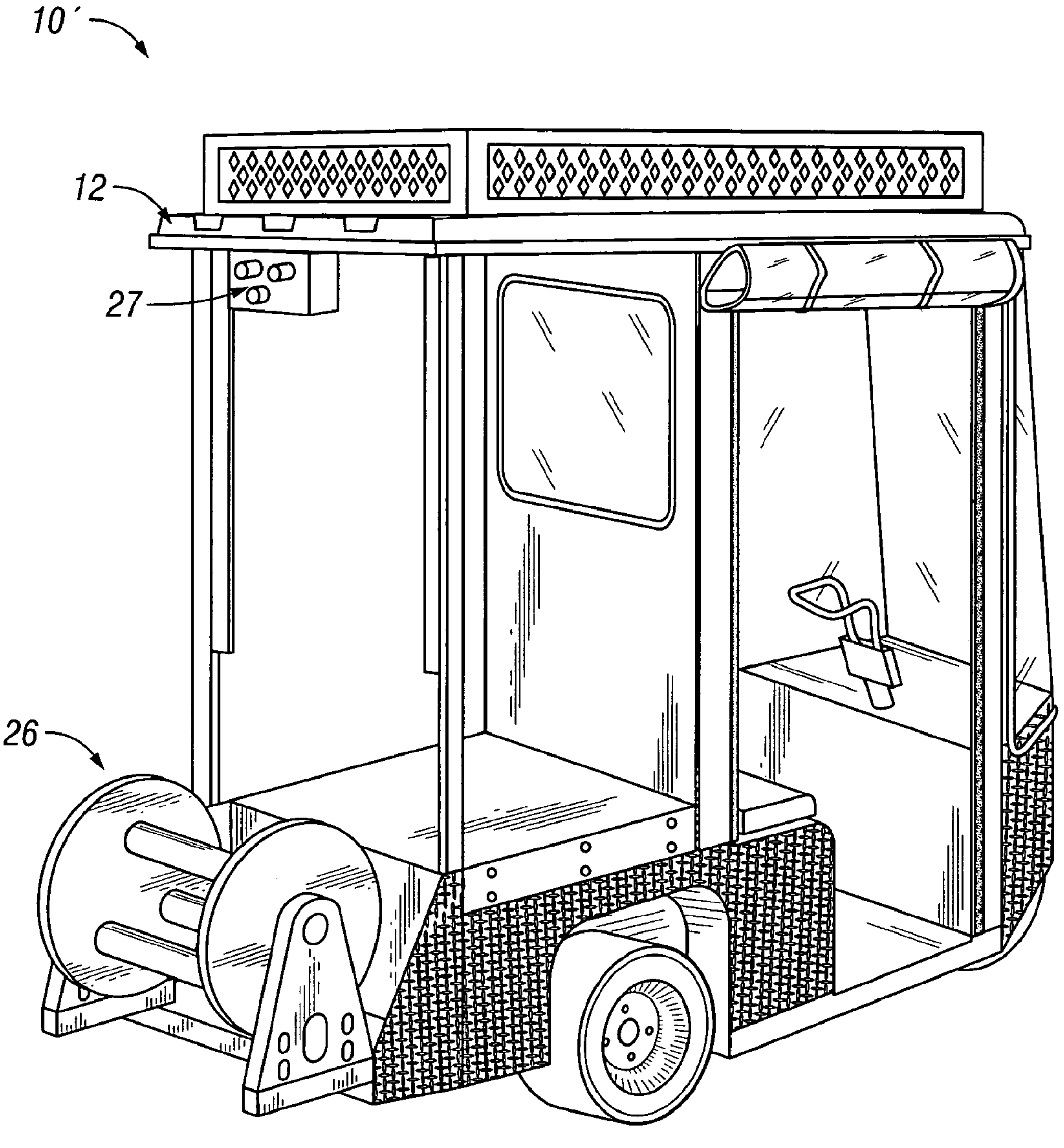
FIG. 5 is a rear view vehicle configured for sewer cleaning support functions.

FIG. 5 shows vehicle 10' configured to perform sewer cleaning support functions. A sewer cleaning support vehicle is designed on the same frame as the video vehicle 10. Vehicle 10' is shown with soft sides, which may be plastic, tarp or the like. The interior space in which drawings and the like can be kept clean and dry. A support vehicle optimally includes at least the following components:

a. A ⅓ horsepower reel 26. The reel 26 is used for storage, feed out, and retrieval of a sewer cleaning water supply hose. The reel capacity is optimally at least 300 ft. of 1¼ ft. lay flat water hose. It is understood that different reels may be used based on the particular application. The reel 26 is also adapted to free-wheel when the support vehicle 10' is laying out the water hose.

b. A reel control unit 27. The reel control unit 27 is configured to control reel 26. The control unit is shown positioned in the upper left side of the rear of vehicle 10'. One skilled in the art understand that the control unit may be positioned anywhere on the vehicle.

c. An on-board battery power source 28 that consist of four 24-volt batteries. The batteries are positioned as shown in FIG. 3. Although four batteries are shown, it is understood that any number of batteries may be used. The voltage provided by the batteries may also be adjusted to suit a particular application. The batteries are charged using recharge receptacle (not shown). Although the vehicle is shown with an on-board battery power source, one skilled in the art understands that alternate sources of power may be provided. For example, the vehicle may be equipped with a gas powered generator.

d. General use tools that include, but are not limited to, fire-hydrant wrenches, water meters, shovels, pick-axes, pry bars, lights, and sledge hammers.

e. Communication equipment such as radios, walkie-talkies, phones, or the like.

B. Method for Using Mobile Vehicles to Clean and Inspect Sewer Lines

A cleaning tuck is positioned as near as possible to a manhole that provides access to the section of sewer to be cleaned or inspected. Alternatively, the cleaning truck may be strategically positioned between the manhole and the nearest water source, depending on the distance between the water source and the manhole. Once the cleaning truck is in position, the cleaning truck operator unloads the hose puller and positions it next to the manhole. The operator then connects the hose puller to a power supply, which is typically provided by the cleaning truck. The power is used to operate the hose puller and hose puller camera. After the hose puller has been connected to a power source, the operator feeds a high pressure water hose from the cleaning truck into the hose puller. Once the high pressure water hose is fed into the hose puller, the hose puller is ready to pull additional high pressure water hose from the cleaning truck to the manhole for line cleaning.

While the hose puller is being positioned, a vehicle 10' configured for sewer cleaning support functions connects one end of the lay-flat hose to the cleaning truck. After the hose is connected, the sewer cleaning support vehicle 10' is repositioned near a convenient water source, such as a fire hydrant. Once in position near a water source, the support vehicle operator connects a water meter and the loose end of the lay-flat hose to the water source. The water meter allows the work crew to monitor the water supply to the cleaning truck and the amount of water used. Close monitoring of water assures a constant water supply for uninterrupted cleaning operations. One skilled in the art understands that the foregoing description can be modified to meet particular applications and equipment. For example, the hose may be connected first to the fire hydrant. Also, the location of the water meter may be positioned anywhere along the line, depending on city ordinances and user requirements.

It is also contemplated that the support vehicle 10' may be equipped with a pump to supply water from non-pressurized water sources to the cleaning truck. Examples of non-pressurized water sources include lakes, ponds, streams, and the like.

At the same time the hose puller is being positioned near the manhole, a vehicle 10 configured for video inspection is also positioned at the manhole to assist the cleaning truck operator in setting up the hose puller and preparing for the sewer line cleaning.

Once the water supply has been hooked up to the cleaning truck, the cleaning jet is then run through the sewer line section. The movement of the cleaning jet is assisted by the hose puller, which pulls the high pressure water hose from the cleaning truck and into the manhole. With the assistance of the hose puller, the cleaning jet is able to run as many as three sections of line. The camera attached to the hose puller allows an operator positioned in or near the cleaning truck to remotely operate the hose puller during the cleaning process. Alternatively, the hose puller can be operated by a control panel on the hose puller.

After preparing the sewer line for cleaning, the vehicle 10 configured for video inspection is repositioned at a manhole upstream of the cleaning operation and the operator of vehicle 10 monitors the cleaning operation. When the cleaning jet arrives at the upstream manhole, the cleaning tuck is notified and the distance between the downstream manhole and the upstream manhole is noted. Knowing the distance between manholes allows the cleaning truck operator to make multiple passes through the sewer line without the further assistance. The video vehicle then surveys the next section of sewer line while the cleaning is underway.

Once the cleaning jet is retrieved, the cleaning truck operator vacuums with a 200 ft. suction hose the debris and sediments that accumulated in the downstream manhole. Alternatively, the vacuuming can be performed concurrently with the cleaning operation.

The support vehicle 10' is positioned at the upstream manhole to assist with the video inspection. The upstream hole is plugged, if necessary, to limit water flow during the video inspection. When the upstream hole has been plugged, the camera is inserted into the newly cleaned sewer section. The cleaned sewer section is then inspected with a robotic video camera. The robotic video camera is controlled by the operator of the video inspection vehicle 10. The inspection footage is stored for future use. The operator of the video inspection unit also records comments and notes as the inspection is underway.

While the video inspection is underway, the cleaning truck retrieves the cleaning nozzle just ahead of the robotic camera so that the line is dewatered and the full circumference of the line can be inspected. The support vehicle retrieves the water meter and disconnects the cleaning truck from the water source.

All vehicles are then moved to the next sewer section that is to be cleaned and the process starts over.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the vehicles and the methods described in the specification. As one will readily appreciate from the disclosure, vehicles and methods presently existing or later to be developed that perform substantially the same function or achieve substantially the same result as the corresponding embodiments described herein may be utilized. Accordingly, the appended claims are intended to include within their scope such articles and methods.

What is claimed is:

1. A mobile inspection vehicle comprising, a compact body with a height greater than its width and having an interior and an exterior;

a seat positioned in the interior of said compact body;

two wheels rotationally engaged to the compact body and positioned such that at least a portion of said wheels are beneath said compact body;

a power source connect to the compact body and operationally associated with at least one of said wheels;

a steering control operationally associated with at least one of said wheels;

a camera boom connected to and adapted to extend a distance away from the compact body and positionable to lower a camera into a manhole;

a transmission line reel attached to the compact body and positioned in operational alignment with said camera boom;

a video inspection camera; and transmission line stored on said reel, wherein said transmission line has a first end connect to a video inspection camera and a second end connect to a video recorder.

2. The mobile inspection vehicle of claim 1 further comprising a reel control box operably connected to said reel for controlling said reel, wherein said reel control box is positioned in the interior of said compact body.

3. The mobile inspection vehicle of claim 2, wherein said reel control box is positioned relative to said seat such that said reel control box is within easy reach of an operator sitting in said seat.

4. The mobile inspection vehicle of claim 3, wherein the camera boom comprises a telescoping body having an upper and lower end;

a mounting bracket connected to said telescoping body and said compact body; and a guide spool rotationally connected to the upper end of said telescoping body, wherein said camera is connected to the lower end of said telescoping body.

5. The mobile inspection vehicle of claim 4, wherein said camera is a pan and tilt camera.

6. The mobile inspection vehicle of claim 4, wherein said camera further includes a laser.

7. The mobile inspection vehicle of claim 6, wherein said telescoping body is at least six feet long when fully extended.

8. The mobile inspection vehicle of claim 7 further comprising a video monitor positioned in the interior of said compact body, wherein said video monitor is operably connected to said camera.

9. The mobile inspection vehicle of claim 8 further comprising a video recorder connected to said camera.

10. The mobile inspection vehicle of claim 9 further comprising an air compressor and air hose, wherein said air hose is accessible from the exterior of said compact body.

11. The mobile inspection vehicle of claim 10 further comprising an air conditioning connected to said compact body such that cool air is provided to the interior of said compact body.

12. The mobile inspection vehicle of claim 9 further comprising a keyboard adapted to enter text onto the video image displayed on the video monitor.

13. The mobile inspection vehicle of claim 12 further comprising a microphone adapted to enter verbal comments onto the video image displayed on the video monitor.

14. A mobile video inspection vehicle for inspecting sewer lines comprising, a body with a width that is less than 4 feet and a height greater than its width;

two wheels rotationally engaged to said body and positioned such that at least a portion of said wheels are beneath said body;

a third wheel steerably engaged to said body and positioned such that a portion of said third wheel is beneath said body;

a monitor;

a camera boom connected to and adapted to extend a distance away from the compact body;

a video inspection camera connected to said monitor for; wherein said video inspection camera is adapted to be positioned remote from said body;

a transmission line reel attached to said body and positioned in operational alignment with said camera boom; and transmission line stored on said reel, wherein said transmission line has a first end connect to a video inspection camera and a second end connect to a video recorder.

15. The mobile video inspection vehicle of claim 14, further comprising a pair of stability wheels extending outwardly from said body and positioned relative to said third wheel.

16. The mobile video inspection vehicle of claim 14, further comprising a camera control box positioned within said body and connected to said video inspection camera.

17. The mobile video inspection vehicle of claim 16, further comprising a video recorder connected to said video inspection camera.

18. The mobile video inspection vehicle of claim 17, further comprising a keyboard adapted to enter text onto inspection images taken by said video inspection camera.

19. The mobile video inspection vehicle of claim 14, wherein said body width is less than 3 feet.

20. A mobile inspection vehicle for inspecting sewer lines comprising, a compact body with a front and a back, wherein the body has a width of less than 4 feet and a height greater than its width;

two wheels rotationally engaged to said body and positioned such that at least a portion of said wheels are beneath said body;

a equipment boom mounted to the back of said body and adapted to support a coaxial cable;

a means for inspecting sewer lines;

a coaxial cable reel unit attached to the back of said body and operably aligned with said equipment boom; and a coaxial cable stored on said reel unit, wherein said coaxial cable has a first end connect to a video inspection camera and a second end connect to a video recorder.

21. The mobile inspection vehicle of claim 20, wherein the equipment boom is a telescoping boom that is extendably connected to said reel unit.

22. The mobile inspection vehicle of claim 20, further comprising a coaxial cable connected to said cable reel unit and said means for inspecting sewer lines.

23. The mobile inspection vehicle of claim 20, wherein said means for inspecting sewer lines comprises a camera.

24. The mobile inspection vehicle of claim 20, further comprising a power source operably connected to said means for inspecting sewer lines.

25. The mobile inspection vehicle of claim 24, wherein the power source comprises a battery.

* * * * *